(12) United States Patent
Asanuma et al.

(10) Patent No.: US 12,030,625 B2
(45) Date of Patent: Jul. 9, 2024

(54) AIRCRAFT

(71) Applicant: HONDA MOTOR CO., LTD., Tokyo (JP)

(72) Inventors: Masahiko Asanuma, Saitama (JP); Susumu Mashio, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/067,734

(22) Filed: Dec. 19, 2022

(65) Prior Publication Data

US 2023/0192285 A1 Jun. 22, 2023

(30) Foreign Application Priority Data

Dec. 22, 2021 (JP) ................................. 2021-208250

(51) Int. Cl.
  *B64C 29/00* (2006.01)
  *B64C 27/24* (2006.01)
  *B64D 35/00* (2006.01)
  *H02K 9/193* (2006.01)

(52) U.S. Cl.
  CPC .......... *B64C 29/0008* (2013.01); *B64C 27/24* (2013.01); *B64D 35/00* (2013.01); *H02K 9/193* (2013.01)

(58) Field of Classification Search
  CPC ................ B64C 29/0008; B64C 27/24; B64C 2001/0045; B64C 29/0025; B64D 35/00; B64D 27/24; B64D 33/10; H02K 9/193
  See application file for complete search history.

(56) References Cited

U.S. PATENT DOCUMENTS

| 6,293,491 | B1 | 9/2001 | Wobben |
| 9,120,560 | B1 | 9/2015 | Armer |
| 9,415,878 | B2 | 8/2016 | Wetzel |
| 9,586,690 | B2 | 3/2017 | Rajashekara |
| 9,845,150 | B2* | 12/2017 | Kroo ......................... B64C 3/56 |

(Continued)

FOREIGN PATENT DOCUMENTS

| DE | 20201400877 U1 | 7/2014 |
| DE | 102016125656 A1 | 6/2018 |

(Continued)

OTHER PUBLICATIONS

Office Action issued for counterpart Japanese Application No. 2021-208250, issued by the Japanese Patent Office on Apr. 23, 2024(drafted on Apr. 17, 2024).

*Primary Examiner* — Valentina Xavier

(57) ABSTRACT

The aircraft includes a fuselage, a front wing and a rear wing provided to extend laterally from the fuselage for generating lift during cruise, a boom 18 supported by the front wing and the rear wing to be spaced apart from the fuselage, and at least one VTOL rotor that is supported on the boom, and having one or more blades for generating thrust in a vertical direction during take-off and landing, wherein the boom has a shape in a top view in which a barrel forms a curvature in a direction away from the fuselage with respect to a front end and a rear end while extending in a front-back direction, and has a cross section in a front view in which an upper side forms a round curvature, the boom being tapered from an upper side from a lower side, and the lower side is substantially flat.

20 Claims, 16 Drawing Sheets

(56) References Cited

U.S. PATENT DOCUMENTS

| | | | |
|---|---|---|---|
| 9,932,108 B1 | 4/2018 | Viele | |
| 10,029,785 B2 | 7/2018 | Niedzballa | |
| 10,081,436 B1 | 9/2018 | Tian | |
| 10,131,426 B2 | 11/2018 | Judas | |
| 10,350,960 B1 | 7/2019 | Long | |
| 10,358,230 B2 | 7/2019 | Sahu | |
| 10,472,064 B2 | 11/2019 | Tian | |
| 10,577,091 B2 | 3/2020 | Parks | |
| 10,836,485 B2 | 11/2020 | Welsh | |
| 11,465,737 B1 * | 10/2022 | McDonald | B64C 29/0025 |
| 2013/0020429 A1 | 1/2013 | Kroo | |
| 2013/0087653 A1 | 4/2013 | Brand | |
| 2015/0232191 A1 | 8/2015 | Wetzel | |
| 2015/0367950 A1 | 12/2015 | Rajashekara | |
| 2016/0207625 A1 | 7/2016 | Judas | |
| 2016/0236774 A1 | 8/2016 | Niedzballa | |
| 2017/0081040 A1 | 3/2017 | Pal | |
| 2018/0072431 A1 | 3/2018 | Sahu | |
| 2018/0093770 A1 | 4/2018 | Welsh | |
| 2018/0105268 A1 | 4/2018 | Tighe | |
| 2018/0170553 A1 | 6/2018 | Wang | |
| 2018/0186445 A1 * | 7/2018 | Fenny | B64C 29/02 |
| 2018/0305005 A1 | 10/2018 | Parks | |
| 2018/0334251 A1 | 11/2018 | Karem | |
| 2019/0047342 A1 | 2/2019 | Dietrich | |
| 2019/0127056 A1 | 5/2019 | Weekes | |
| 2019/0135425 A1 * | 5/2019 | Moore | B64D 27/026 |
| 2019/0233107 A1 | 8/2019 | Tian | |
| 2019/0337613 A1 | 11/2019 | Villa | |
| 2020/0115045 A1 | 4/2020 | Mermoz | |
| 2020/0354048 A1 | 11/2020 | Melo | |
| 2021/0344104 A1 | 11/2021 | Bye | |
| 2023/0036722 A1 | 2/2023 | Hanamitsu | |

FOREIGN PATENT DOCUMENTS

| | | |
|---|---|---|
| JP | 5676824 B2 | 2/2015 |
| JP | 2017081040 A | 5/2017 |
| JP | 6469488 B2 | 2/2019 |
| JP | 2020515031 A | 5/2020 |
| JP | 2020131781 A | 8/2020 |
| JP | 2021119080 A | 8/2021 |
| JP | 2021154802 A | 10/2021 |
| WO | 2021210065 A1 | 10/2021 |

* cited by examiner

AIRCRAFT

CROSS-REFERENCE TO RELATED APPLICATIONS

The contents of the following Japanese patent application(s) are incorporated herein by reference:
NO. 2021-208250 filed in JP on Dec. 22, 2021

BACKGROUND

1. Technical Field

The present invention relates to an aircraft.

2. Related Art

Conventionally, a vertical take-off and landing type aircraft (also called a vertical take-off and landing aircraft or simply an aircraft) is known which performs take-off and landing by elevating and lowering in a vertical direction with rotors for vertical take-off and landing (VTOL) arranged on the right side and the left side of the fuselage, and flies in a horizontal direction with a cruising rotor arranged on the back portion of the fuselage. Here, Patent Document 1 discloses an aircraft comprising a boom control effector having a teardrop shape (also called a wing shape) such that airflow generated by the VTOL rotor is directed downward and configured to further control the direction of the airflow. On the other hand, a plurality of VTOL rotors is arrayed in a non-linear manner on a side of the fuselage in order to keep the entire aircraft body to be within a prescribed size as well as to arrange a number of larger rotors (see Patent Document 2, for example). Patent Document 1: U.S. Patent Application Publication No. 2019/0135425

Patent Document 2: U.S. Patent Application Publication No. 2019/0047342

However, in order to support a plurality of VTOL rotors arrayed in a non-linear manner by one boom, there is a need to mold the boom to extend in a front-back direction while forming a lateral curvature. Such a boom with a curved shape has a issue that it experiences a strong resistance during cruise of the aircraft.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
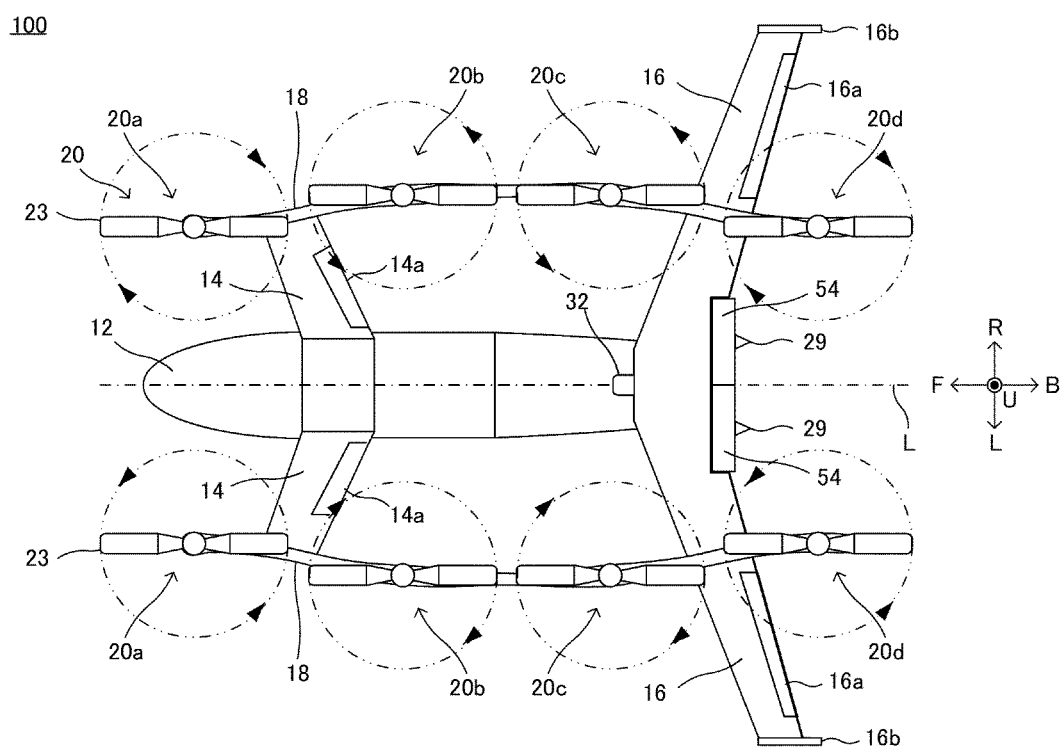
FIG. 1 illustrates a configuration of an aircraft according to the present embodiment in a top view.

FIG. 1 illustrates a configuration of an aircraft 100 according to the present embodiment in a top view. The aircraft 100 includes a rotor having an electric motor as its driving source, is a vertical take-off and landing aircraft that performs take-off and landing in a vertical direction by using rotors for vertical take-off and landing (VTOL) to generate thrust, as well as flies in a horizontal direction by using a cruising rotor (also called a cruise rotor) to generate thrust, and is a hybrid aircraft that is capable of operating an electric motor with electric power supplied from each of a battery and a motor generator while charging the battery with the motor generator. The aircraft 100 according to the present embodiment includes a boom that is capable of suppressing resistance experienced during cruise in particular, and includes a fuselage 12, a front wing 14, a rear wing 16, two booms 18, eight VTOL rotors 20, two cruising rotors 29, a cooling system 60, and an airflow guide structure 70. Note that, the plane of rotation and the rotational direction of the one or more blades 23 of the VTOL rotors 20a, 20b, 20c, 20d are illustrated by using double dotted lines and arrows.

The fuselage 12 is a structure body for providing space for crews and passengers to board and to load cargo or the like, and for storing apparatuses such as the battery or the motor generator (neither are shown). store The fuselage 12 is symmetric relative to a central axis L, and has a shape that extends in a front-back direction that is parallel to the central axis L and is thin in the left-right direction that is orthogonal to the central axis L in the horizontal plane. Here, the direction parallel to the central axis L is defined as the front-back direction, in which the left side of the drawing and the right side of the drawing are respectively the front (F) and back (B), and the direction orthogonal to the central axis L in the horizontal plane is defined as the width direction (or the left-right direction), in which the upper side of the drawing and the lower side of the drawing are respectively the right (R) and left (L). In addition, the vertical direction is orthogonal to each of these front-back direction and the width direction, in which the upward and downward in the vertical direction are also respectively referred to as upper (U) and lower (L). The fuselage 12 has a front end with a round curvature in a top view, and a rear end parallel to the width direction that is tapered to some extent relative to the barrel portion.

The front wing 14 is a wing body provided to extend laterally from the fuselage 12, and configured to generate lift during cruise, that is, by moving forward, which functions as a canard of the aircraft 100. The front wing 14 has a V-shape with two wing bodies respectively extending from the center portion to the front-left direction and the front-right direction, and is fixed on the upper portion of the front side of the barrel portion of the fuselage 12 at the center portion with the opening of the V-shaping facing toward the front. The front wing 14 includes elevators 14a arranged on the rear edge in each of the two wing bodies.

The rear wing 16 is a wing body provided to extend laterally from the fuselage 12, and configured to generate lift during cruise, that is, by moving forward, which functions as a swept-back wing configured to reduce air resistance. The rear wing 16 has a V-shape with two wing bodies respectively extending from the center portion to the rear-left direction and the rear-right direction, and is fixed on the upper portion of the rear end of the fuselage 12 at the center portion with the opening of the V-shaping facing toward the back via a pylon 32. The rear wing 16 includes an elevon 16a arranged on the rear edge in each of the two wing bodies, and a vertical tail 16b arranged on a wing end.

Here, the wing area of the rear wing 16 is greater than that of the front wing 14, and the wing width of the rear wing 16 is wider than that of the front wing. In this manner, the lift generated by the rear wing 16 by moving forward is greater than the lift generated by the front wing 14, and the rear wing 16 functions as the main wing of the aircraft 100. Note that, the wing areas, the lengths or the like of the front wing 14 and the rear wing 16 may be defined based on the balance of the lift generated by each wing, the center of gravity, the posture of the aircraft body during cruise, and the like.

The two booms 18 are structure bodies that are supported by the front wing 14 and the rear wing 16 to be spaced apart from the fuselage 12 to the left and to the right, respectively, and functions to support or store each units in the configuration of the VTOL rotor 20 and the cooling system 60 described below. The two booms 18 each have a cylindrical shape in a top view in which the barrel forms an arc-shaped curvature in a direction to be spaced apart from the fuselage 12 with respect to the front end and the rear end while extending in the front-back direction, as well as a cross section in a front view in which the upper side forms a round curvature, the booms 18 being tapered from the upper side toward the lower side, and in which the lower side is substantially flat (that is, substantially parallel in front-back and left-right direction), and are paired to be arranged symmetrically with respect to the fuselage 12 (that is, the central axis L). Note that, although the two booms 18 are described to extend in the front-back direction and form an arc-shaped curvature in the width direction, are not limited to an arc-shape, and they may bend in a hook-shape. The two booms 18 have their front side end portions positioned forward of the front wing 14 to be supported by the ends of the front wing 14 at the front side barrel portion (between the two VTOL rotors 20a, 20b on the front side), and have their rear side end portions positioned behind the rear wing 16 to be supported by the rear wing 16 at the rear side barrel portion (between the two VTOL rotors 20c, 20d on the rear side).

Figure 2A:
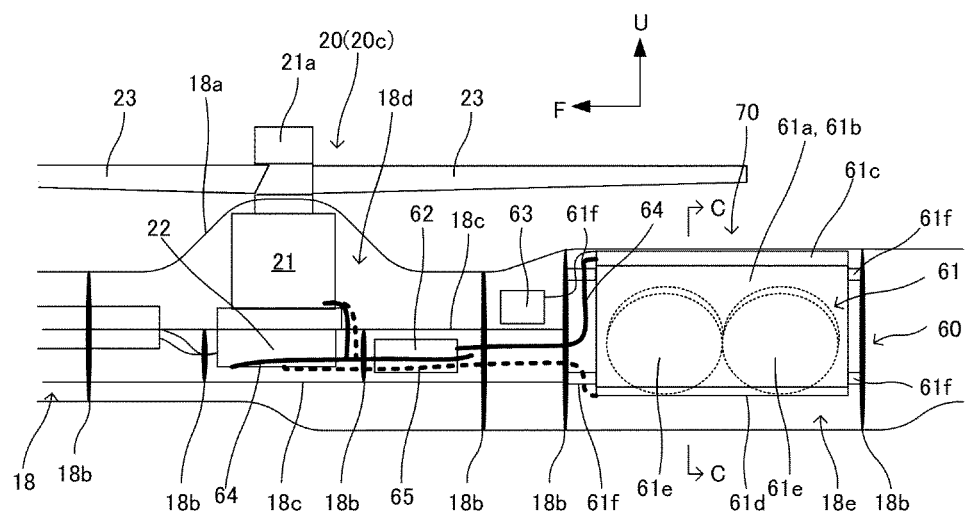
FIG. 2A illustrates an internal configuration of a boom.

FIG. 2A illustrates an internal configuration of the boom 18. The boom 18 includes a skin 18a, a rib 18b, and a spar 18c. The skin 18a is a member that constitutes the surface of the boom 18 and is molded to be in a cylindrical shape extending in the front-back direction while having a wing-shaped cross section and forming a laterally arc-shaped curvature. The skin 18a rises high above where the VTOL rotor 20 is arranged and spreads in the left-right direction to form a space 18d, and rises to some extent above where the cooling system 60 is arranged and spreads in the left-right direction to form a space 18e. The rib 18b is a wing-shaped plate member, and is arranged in a plurality of locations in the front-back direction to retain the skin 18a from the inside. Note that, the spaces 18d, 18e within the boom 18 are partitioned by the rib 18b. The spar 18c is a bar member that extends in the front-back direction, and constitutes a backbone for supporting the rib 18b and other members. Note that, the shape of the boom in which the resistance experienced during cruise is suppressed will be described below.

The eight VTOL rotors 20 (20a to 20d) are rotors that are supported by the two booms 18 to generate thrust in the vertical direction during take-off and landing. Four VTOL rotors 20a to 20d among the eight VTOL rotors 20 are supported at a substantially equal interval by the boom 18 on the left-hand side, and the remaining four VTOL rotors 20a to 20d are supported at a substantially equal interval by the boom 18 on the right-hand side. Here, the VTOL rotor 20a is arranged frontmost, the two VTOL rotors 20b, 20c are arranged to be front and back, respectively, between the front wing 14 and the rear wing 16, and the VTOL rotor 20d is arranged last. Among the VTOL rotors 20a to 20d on the left-hand side and the four VTOL rotors 20a to 20d on the right-hand side, each two VTOL rotors 20a to 20d at the same position relative to the front-back direction are paired, and are controlled to rotate in reverse directions from each other, as shown in FIG. 1. Unless stated otherwise, each of the eight VTOL rotors 20a to 20d is referred to simply as the VTOL rotor 20.

The VTOL rotor 20 includes one or more blades 23, a motor 21, and an inverter 22. Note that, the motor 21 and the inverter 22 are also called electrical components. Note that, the configuration of the VTOL rotor 20c on the left-hand side and the internal structure of the boom 18 on the left-hand side that stores the VTOL rotor 20c is illustrated in FIG. 2A to represent the eight VTOL rotors 20.

The one or more blades 23 are supported on the boom 18 as illustrated in FIG. 2A, and are vane-shaped members that generate thrust in the vertical direction by rotation thereof. In the present embodiment, the number of the blades 23 is two, but it may be any number including one or three or more. The one or more blades 23 are supported at a position higher than the front wing 14 and the rear wing 16. Note that, in FIG. 1, the plane of rotation of the one or more blades 23 of each VTOL rotor 20 is illustrated by using two-dotted lines.

The motor 21 is an electric motor that has a rotational axis 21a that faces toward the up-down direction, via which the blade 23 fixed on the end thereof is caused to rotate, and is supported by the spar 18c via the support member to be stored in the space 18d of the boom 18.

The inverter 22 is an apparatus for receiving DC power supply from a battery, convert it to AC power, and supply it to the motor 21, and is supported below the motor 21 by the spar 18c. The inverter 22 can control the rate of rotation of the motor 21.

The two cruising rotors 29 are rotors that are supported by the rear end of the fuselage 12 to generate thrust during cruise. The cruising rotors 29 are arranged side by side on the left and right to the central axis L in a cylindrical duct 54 fixed to the rear end of the fuselage 12, and have one or more blades that are supported in the duct 54 to generate a forward thrust by rotation thereof, motors that have rotational axes toward the front-back direction, via which the one or more blades fixed to the end are caused to rotate, and inverters that receive DC power supply from the battery and converts it to AC power to supply it to the motor (neither are shown). The inverter can control the rate of rotation of the motor.

The cooling system 60 is a system for cooling the motor 21 and the inverter 22 that constitute the VTOL rotor 20 in a liquid cooling manner by using the radiator 61 arranged within the boom 18. Although, in the present embodiment, one cooling system 60 is provided for a plurality of (for example, two) VTOL rotor 20, making a total of four cooling systems 60, it is not limited thereto, and one cooling system 60 may be provided for one VTOL rotor 20. The cooling system 60 includes a radiator 61, a pump 62, a coolant fluid tank 63, and tubes 64, 65. Note that, water can be used as the coolant fluid.

Figure 2B:
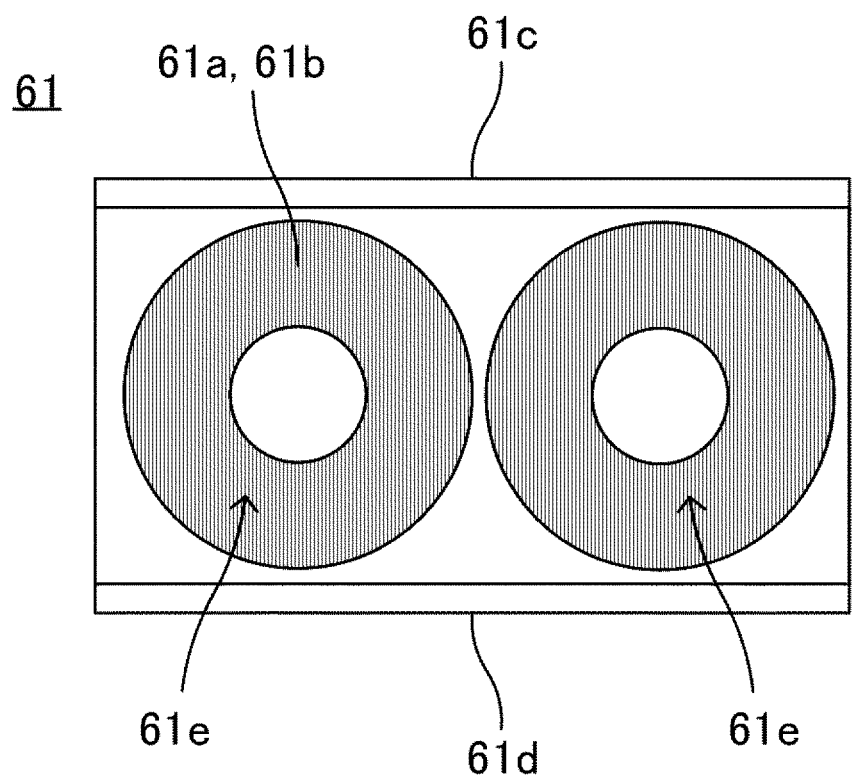
FIG. 2B illustrates a configuration a radiator in a front view.
Figure 2C:
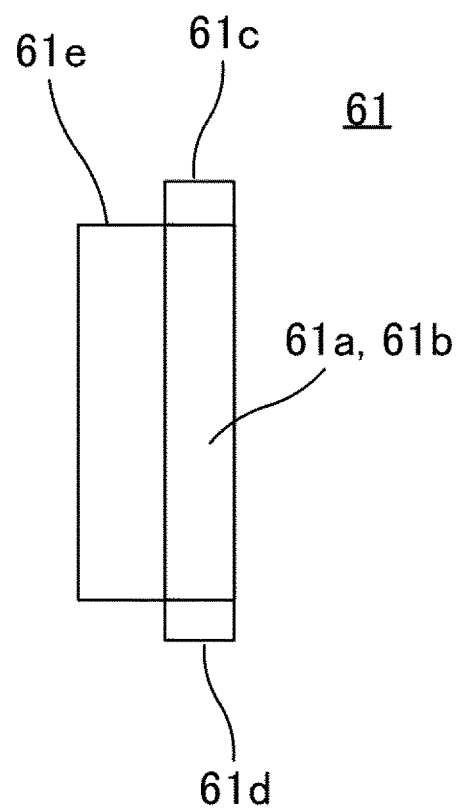
FIG. 2C illustrates a configuration of the radiator in a side view.

FIG. 2B and FIG. 2C illustrate configurations of the radiator 61 in a front view and a side view, respectively. The radiator 61 is a heat exchanger for cooling the coolant fluid to cool the motor 21 and the inverter 22. Note that, the radiator 61 is supported between the two ribs 18b by using a support member 61f, and is stored within the boom 18 by the airflow guide structure 70 described below. The arrangement in the boom 18 of the radiator 61 will be described below. The radiator 61 includes a plurality of tubes 61a for causing the coolant fluid to flow upward and downward, a plurality of fins 61b fixed to each of the plurality of tubes 61a to increase the surface area that the airflow contacts, an upper tank 61c for sending the coolant fluid to the plurality of tubes 61a, a lower tank 61d for receiving the coolant fluid from the plurality of tubes 61a, and two fans 61e for sending the airflow to the plurality of fins 61b.

The plurality of tubes 61a are arranged in a horizontal direction, assembled in a rectangular shape in the front view with the plurality of fins 61b, and constitutes the radiator main body with the upper tank 61c fixed on the upper side thereof and the lower tank 61d fixed on the lower side thereof. Operation of the pump 62 described below causes the coolant fluid having been heated by circling through the motor 21 and the inverter 22 to be fed to the upper tank 61c via the tube 64, to be cooled by flowing downward through each of the plurality of tubes 61a and sent to the lower tank 61d, and to be sent to the motor 21 and the inverter 22 via the tube 65. At this time, the two fans 61e operate to feed the airflow from one side (right-hand side in FIG. 2C) of the radiator main body so as to contact the plurality of fins 61b, thereby causing heat exchange between the airflow and the radiator main body. The heated airflow is leaked and discharged from the other side (left-hand side in FIG. 2C) of the radiator main body.

The pump 62 is connected to the radiator 61 via the tube 65, and receives the coolant fluid that is cooled therefrom, and feeds the same to the motor 21 and the inverter 22. In accordance with this, the coolant fluid having been heated through the motor 21 and the inverter 22 is fed to the radiator 61 via the tube 64.

The coolant fluid tank 63 is a container for storing the coolant fluid. For example, in a case where there is a shortage of the coolant fluid, the coolant fluid is sent from the coolant fluid tank 63 to the cooling circuit to supplement the coolant fluid.

The tubes 64, 65 are members for transporting the coolant fluid, and connects the radiator 61 and the pump 62 to the motor 21 and the inverter 22 to constitute a cooling circuit through which the coolant fluid circles.

Figure 2D:
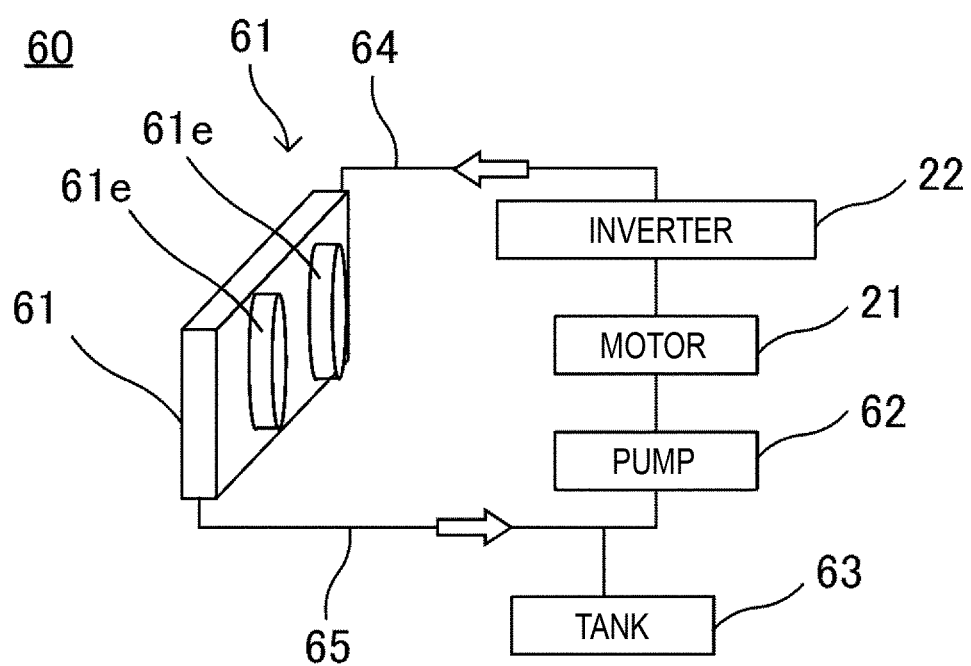
FIG. 2D illustrates a configuration of a cooling circuit.

FIG. 2D illustrates a configuration of the cooling circuit. The upper tank 61c of the radiator 61 is connected to the motor 21 and the inverter 22 by the tube 64. Note that, since one cooling system is provided for two VTOL rotors 20 in the present embodiment, the illustrated motor 21 is meant to describe the motors 21 of the two VTOL rotors 20 that are connected in series or in parallel, and the illustrated inverter 22 is meant to describe the inverters 22 of the two VTOL rotors 20 that are connected in series or parallel. The lower tank 61d of the radiator 61 is connected to the motor 21 and the inverter 22 via the pump 62 by the tube 65. The coolant fluid tank 63 is connected to the tube 65. The operation of the pump 62 causes the coolant fluid heated in the motor 21 and the inverter 22 to be sent to the radiator 61 via the tube 64, and the coolant fluid cooled at the radiator 61 is sent to the motor 21 and the inverter 22 via the tube 65.

Note that, in the cooling circuit provided by the cooling system 60, the motor 21 and the inverter 22 are connected in series downstream of the pump 62, but they may alternatively be connected in parallel. In addition, other electrical components may be connected to the motor 21 and the inverter 22 in series or in parallel. In addition, in the cooling system 60, the cooling circuit is configured such that both of the motor 21 and the inverter 22 are cooled by one radiator 61, a pump 62, and a tank 63, but alternatively, two independent cooling circuits may be configured for individually cooling the motor 21 inverter 22 by connecting a radiator 61, a pump 62, and a tank 63 to each of the motor 21 and the inverter 22.

Note that, a cooling system having a configuration similar to that of the cooling system 60 may be provided to cool the electrical components of the cruising rotor 29.

Figure 3:
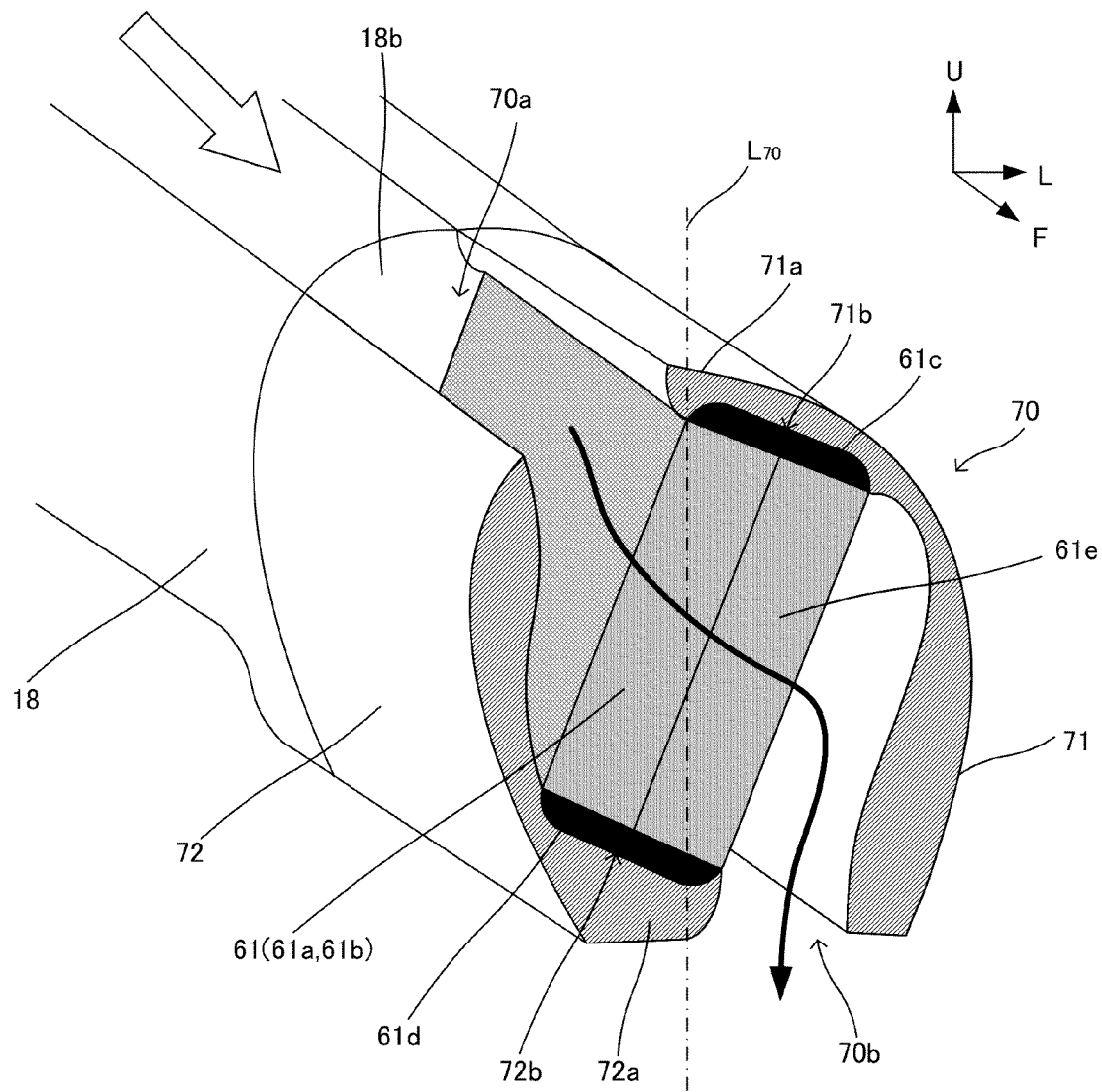
FIG. 3 illustrates a cross-sectional structure of an airflow guide structure relative to reference line CC in FIG. 2A.

FIG. 3 illustrates a cross-sectional structure of an airflow guide structure 70 relative to reference line CC in FIG. 2A. Note that, the central axis relative to the width direction of the airflow guide structure 70 is defined as the central axis $L_{70}$. The central axis $L_{70}$ is parallel to the rotational axis 21a of the VTOL rotor 20. The airflow guide structure 70 is a structure that is provided in a part of the boom 18 to constitute an storage portion for storing the radiator 61, the structure being for guiding the airflow generated by rotation of the one or more blades 23 to t radiator 61 within the boom 18, and having an upper structure body 71 and a lower structure body 72.

The upper structure body 71 is a member having a substantially reversed-L shaped cross section forming an upper edge and a left-side edge by being inserted into the barrel of the boom 18. The upper structure body 71 may be molded to be solid, the end of the upper edge is tilted in an upper-right direction, a recess 71b extending obliquely downward in a front-back direction is formed on a lower surface of the upper edge, and the inner surface of the left-side edge (that is, the right surface) is formed to be in a streamline shape expanding leftward from the recess 71b on a plane that is orthogonal to the front-back direction, and returning rightward to some extent to extend downward therefrom. The upper edge of the upper structure body 71 functions as a beam 71a installed on the upper side of the inlet 70a formed between the upper structure body 71 and the lower structure body 72. In this manner, the bending stress applied to the boom 18 including the airflow guide structure 70 can be resisted.

The lower structure body 72 is a member having a substantially L-shaped cross section forming a lower edge and a right-side edge by being inserted into the barrel of the boom 18. The lower structure body 72 may be molded to be solid, a recess 72b extending obliquely upward in a front-back direction is formed on an upper plane of the lower edge, the left end of the lower edge faces downward, the upper end of the right-side edge is tilted toward the upper-right direction, and the inner surface of the right-side edge (that is, the left surface) is molded to be in a streamline shape expanding leftward to some extent from the upper end on a plane that is orthogonal to the front-back direction, and returning rightward to some extent to extend downward therefrom. The lower edge of the lower structure body 72 functions as a beam 72a installed on the lower side of the outlet 70b formed between the upper structure body 71 and the lower structure body 72. In this manner, the bending stress applied to the boom 18 including the airflow guide structure 70 can be resisted.

By assembling the airflow guide structure 70 by using the upper structure body 71 and the lower structure body 72 having the configurations described above, an inlet 70a for taking in the airflow is formed on the upper side and an outlet 70b for letting out the airflow is formed on the lower side within the boom 18. First, the radiator 61 and the fan 61e are stacked, then, the upper structure body 71 is fixed to the spar 18c, the upper tank 61c of the radiator 61 is engaged into the recess 71b of the upper structure body 71 and a bracket provided in the upper tank 61c is fixed to the spar 18c. Then, the lower structure body 72 is fixed to the spar 18c, the lower tank 61d of the radiator 61 is engaged into the recess 72b of the lower structure body 72 and a bracket provided in the lower tank 61d is fixed to the spar 18c. In this manner, the airflow guide structure 70 is integrally assembled in the barrel of the boom 18. At this time, the radiator 61 and the fan 61e are supported between the two ribs 18b within the boom 18 by using the support member 61f.

In this manner, the inlet 70a is formed to be positioned on the side of one plane (suction plane) of the radiator 61 between the upper edge of the upper structure body 71 and the right-side edge of the lower structure body 72, and the outlet 70b is formed to be positioned on a side of the other plane (discharge plane) of the radiator 61 between the left-side edge of the upper structure body 71 and the lower edge of the lower structure body 72. At the same time, the radiator 61 will be arranged between the inlet 70a and the outlet 70b within the boom 18, and provided to be tilted with its suction plane facing toward the inlet 70a side and its discharge plane facing toward the outlet 70b side, with respect to the rotational axis 21a (that is, the central axis $L_{70}$) of the VTOL rotor 20. Further, two fans 61e are arranged on the discharge plane side of the radiator 61. Note that, the two fans 61e may be arranged don the suction plane side of the radiator 61.

Figure 4A:
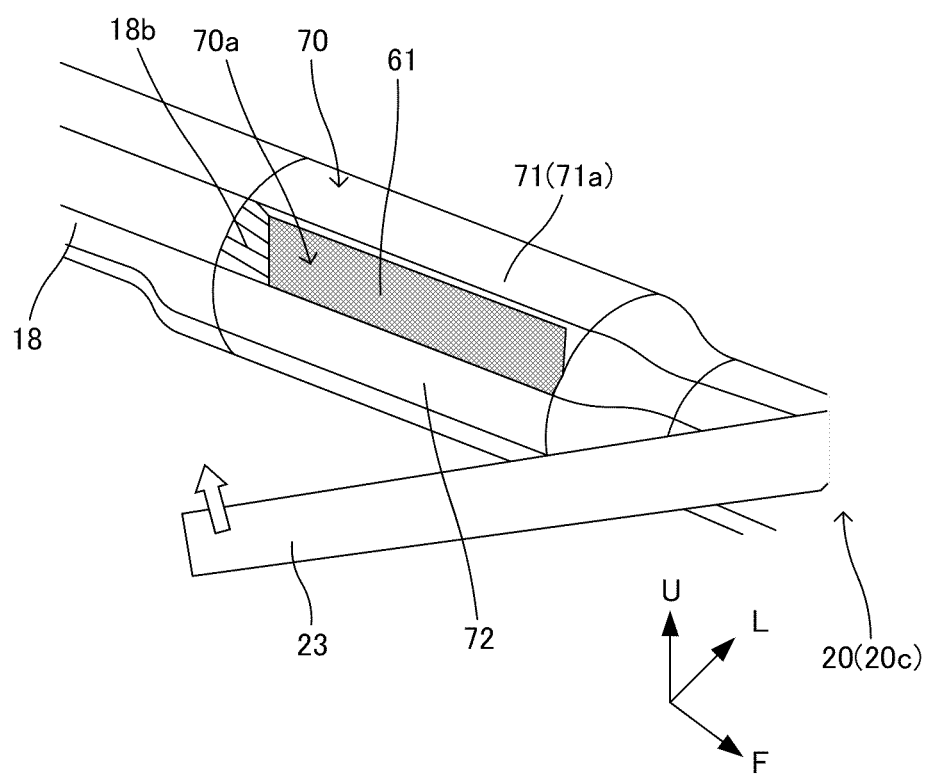
FIG. 4A illustrates a configuration of the upper side of the airflow guide structure and an arrangement of an inlet.

FIG. 4A illustrates a configuration of the upper side of the airflow guide structure 70 provided in the boom 18. The airflow guide structure 70 is a structure including a radiator 61 for cooling the VTOL rotor 20c on the left-hand side, as an example, and is provided in the boom barrel between the rotational axes 21a of the two VTOL rotors 20c, 20d (that is, the rear side of the VTOL rotor 20c). By the airflow guide structure 70, the inlet 70a is provided between the rotational axes 21a of the two VTOL rotors 20c, 20d on the surface of the boom 18, and is provided on a side that faces toward the rotational direction (leftward in the present example) of the one or more blades 23, that is, the opposite side with respect to the rotational direction (right-hand side in the present example), with respect to the rotational axis 21a (the central axis $L_{70}$) of the VTOL rotor 20c in the front view, of a surface of the boom 18 positioned below the plane of rotation of the one or more blades 23 of at least one of the two VTOL rotors 20c, 20d, particularly the VTOL rotor 20c in the present example.

Here, the blade 23 of the VTOL rotor 20 has a pitch angle with respect to the plane of rotation to generate thrust (see FIG. 2A). Therefore, when the blade 23 rotates in a clockwise direction as illustrated in FIG. 4A, for example, an airflow is generated in a direction that is tilted toward the rotational movement direction of the blade 23 with respect to the downward direction, that is, the lower-left direction (the direction of the outlined arrow in FIG. 3). Accordingly, in the airflow guide structure 70, providing the inlet 70a on the right-hand side with respect the rotational axis 21a (the central axis $L_{70}$) of the VTOL rotor 20c in the front view can cause the airflow generated by rotation of the one or more blades 23 of at least one rotor, particularly the VTOL rotor 20c in the present example to be efficiently guided to the radiator 61 within the boom 18 via the inlet 70a, when the two VTOL rotors 20c, 20d are activated.

In addition, as illustrated in FIG. 3, since the end on the upper edge of the upper structure body 71 of the airflow guide structure 70 is tilted toward the upper-right direction and the upper end of the right-side edge of the lower structure body 72 is tilted toward the upper-right direction, having the end of the upper edge of the upper structure body 71 and the upper end of the right-side edge of the lower structure body 72 opposing each other in the airflow guide structure 70 causes the inlet 70a to be provided to face toward the rotational direction (leftward in FIG. 3) of the blade 23 of the VTOL rotor 20b with respect to the central axis $L_{70}$ while being tilted toward the upper-right direction. In this manner, the airflow generated by rotation of the one or more blades 23 of the VTOL rotor 20b can be efficiently guided to the radiator 61 within the boom 18 via the inlet 70a.

Figure 4B:
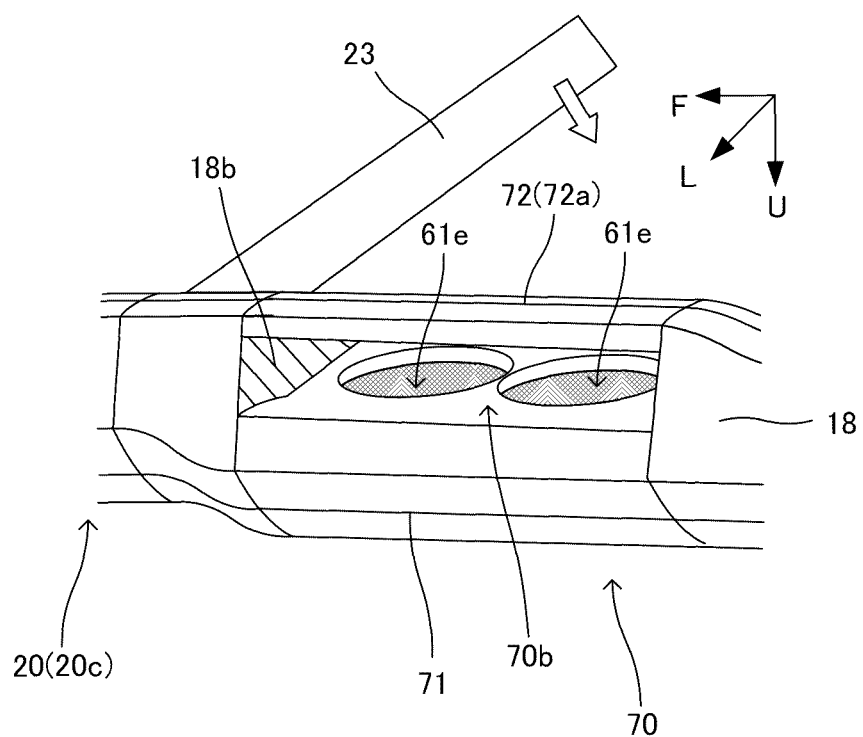
FIG. 4B illustrates a configuration of the lower side of the airflow guide structure and an arrangement an outlet.

FIG. 4B illustrates a configuration of the lower side of the airflow guide structure 70 described above. By the airflow guide structure 70, the outlet 70b is provided at a position opposing the inlet 70a on the lower side of the boom 18. In this manner, the airflow introduced via the inlet 70a on the upper side is discharged downward from the outlet 70b on the lower side through the inside of the boom 18, thereby enabling the airflow to efficiently pass through the inside of the boom 18.

The outlet 70b is provided, of the lower portion of the boom 18, in the front view, on a side that follows the rotational direction (leftward in the present example) of the one or more blades 23 with respect to the rotational axis 21a (the central axis $L_{70}$) of the VTOL rotor 20b in the present example, that is, a side corresponding to the rotational direction (the left-hand side in the present example). That is, the outlet is positioned on a side that is opposite from the inlet 70a with respect to the rotational axis 21a (the central axis $L_{70}$) of the VTOL rotor 20b, of the lower portion of the boom 18. In this manner, the flow channel within the boom 18 of the airflow introduced via the inlet 70a becomes longer so that the airflow is in contact with the radiator 61 for a long distance before being drawn out from the outlet 70b, thereby enabling the radiator 61 to be efficiently cooled.

In addition, as illustrated in FIG. 3, since the left end on the lower edge of the lower structure body 72 of the airflow guide structure 70 faces downward and the right-inner surface on the left-side edge of the upper structure body 71 is molded in a streamline shape facing downward, the left end on the lower edge of the lower structure body 72 and the lower end on the left-side edge of the upper structure body 71 opposes in the airflow guide structure 70, so that the outlet 70b faces further downward with respect to the inlet 70a that is provided to tilt toward the upper-right direction. In this manner, the airflow that is introduced inside the boom 18 toward the lower-left direction via the inlet 70a is drawn out further downward via the outlet 70b, thereby enabling the thrust in the vertical direction applied to the boom 18 (that is, the aircraft body of the aircraft 100) to be increased. In addition, the structure of such a airflow guide structure 70 enables the output of the fan 61e to be used as the thrust in the vertical direction applied to the boom 18 (that is, the aircraft body).

Note that, in the airflow guide structure 70, the inlet 70a is provided on the upper portion of the boom 18, but it is not limited thereto, and the airflow guide structure 70 may be provided at any position between the upper portion and the side portion of the boom 18 as long as the airflow generated by rotation of the one or more blades 23 can be efficiently introduced into the boom 18 when the VTOL rotor 20 is activated.

The shape of the boom in which the air resistance experienced during cruise is suppressed will be described.

Figure 5A:
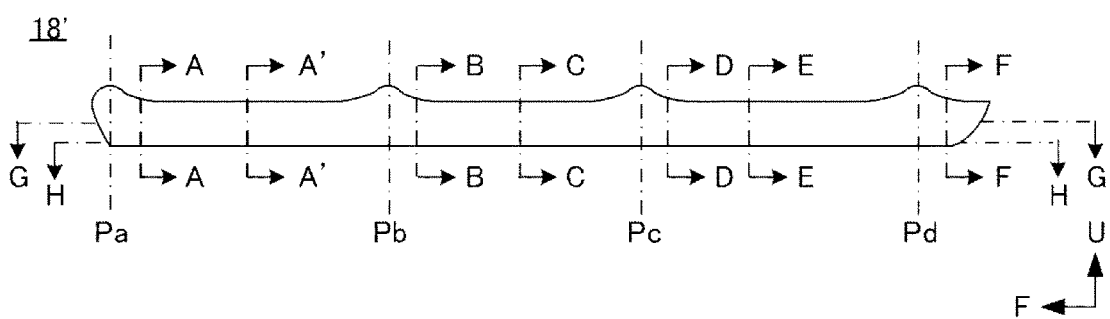
FIG. 5A illustrates a shape of a boom according to a comparative example.
Figure 5A:
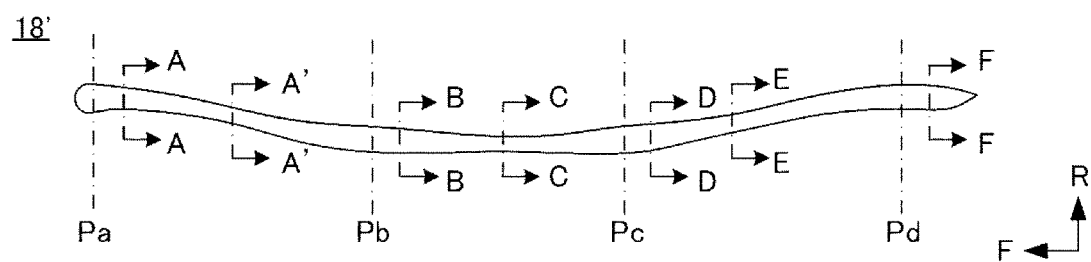
Figure 5A:
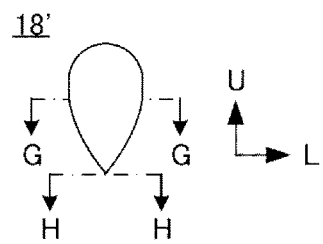

FIG. 5A illustrates a shape of a boom 18' according to a comparative example. Note that, the boom 18' is a boom that is arranged on the left-hand side of the fuselage 12, and a boom on the right-hand side is configured to be symmetric therewith. Here, the shape of the boom 18' in the side view is shown in the top tier, the shape of the boom 18' in the top view is shown in the middle tier, and the cross section of the boom 18' on reference line AA in the front view is shown in the bottom tier. The positions (rotor positions) Pa, Pb, Pc, Pd at which the VTOL rotors 20a, 20b, 20c, 20d are placed, that is, at which the motors 21 thereof are stored are illustrated by alternate long and short dash lines.

The boom 18' is desirably molded to have a wing-shaped cross section in which the upper side forms a round curvature in a front view, as shown in the bottom tier, being tapered from the upper side toward the lower side, such that the down wash generated by rotation of the VTOL rotor 20 flows downward smoothly, thereby reducing air resistance. However, the upper end is raised at the rotor positions Pa, Pb, Pc, Pd of the VTOL rotors 20a, 20b, 20c, 20d in the side view, as shown in the top tier, and the barrel is molded to extend in the front-back direction while forming an arc-shaped curvature leftwardly with respect to the front end and the rear end in the top view, as shown in the middle tier, which causes the air resistance experienced by the boom 18' during cruise to increase.

Figure 5B:
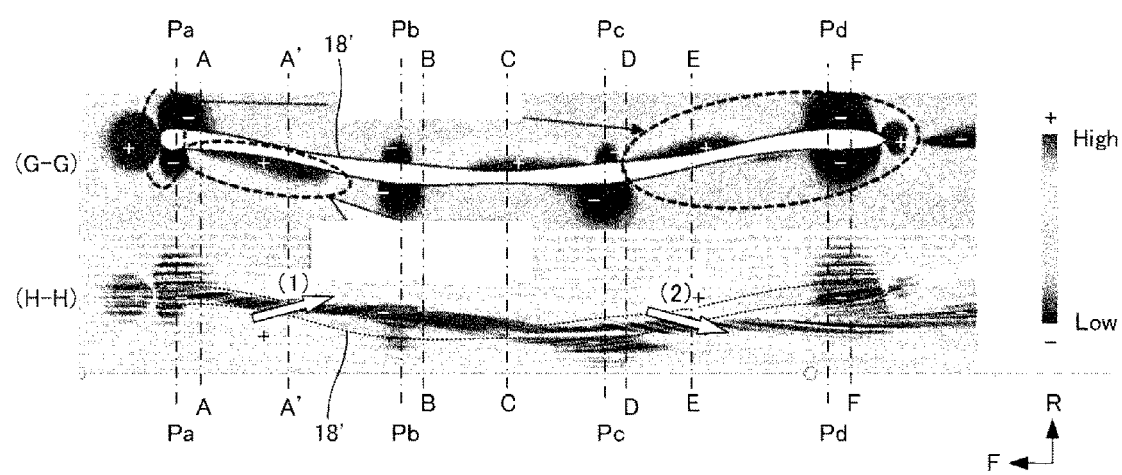
FIG. 5B illustrates an analysis result according to numerical fluid dynamics of air resistance (pressure distribution in a cross section in an up-down direction) experienced by the boom according to the comparative example during cruise.

FIG. 5B illustrates an analysis result according to numerical fluid dynamics of air resistance experienced by the boom 18' according to the comparative example during cruise. Here, pressure distributions (static pressure) of the airflow in a cross section in an up-down direction at each of reference lines GG, HH shown in FIG. 5A are respectively shown in the upper tier and the lower tier. Note that, in the pressure distribution in the lower tier, the dotted lines indicate the cross section of the boom 18' that overlaps in the top view, and a white line that flows laterally represents the streamline the airflow.

The boom 18' receives the airflow that flows from the front to the back during cruise. In this manner, on a plane that includes the approximate center of the boom 18' relative to the reference line GG, that is, the up-down direction, a high-pressure region (+) is generated at the front side of the front end of the boom 18', on the left (that is, outside) slightly on the front side between the rotor positions Pa, Pb, on the right (that is, inside) slightly at the rear side between the rotor positions Pb, Pc, on the right (that is, inside) at the front side between the rotor positions Pc, Pd, and at the rear side of the rear end, and a low pressure region is generated on the right (that is, inside) between the rotor positions Pa, Pb, on the left (that is, outside) between the rotor positions Pb, Pc, and on the left (that is, outside) between the rotor positions Pc, Pd. In addition, a lower pressure region (−) is generated on the left and right of each of the rotor positions Pa, Pb, Pc, Pd.

Due to such pressure difference on the left end right of the boom 18', at the reference line HH, that is, on a plane including the approximate lower end of the boom 18', as shown by the arrow (1), an airflow that flows below the boom 18' from the left to right (from the outside to the inside) between the rotor positions Pa, Pb is generated, and as shown by the arrow (2), an airflow that flows below the boom 18' from right to left (from the inside to the outside) is generated on the front side of the rotor position Pc and between the rotor positions Pc, Pd.

Figure 5C:
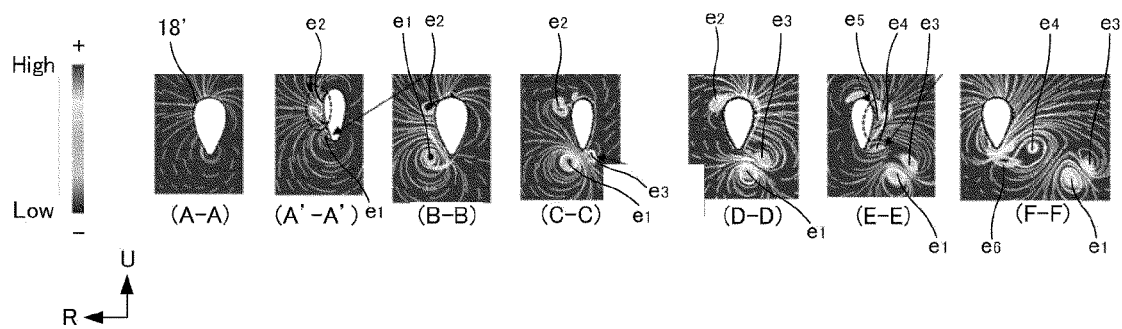
FIG. 5C illustrates an analysis result according to numerical fluid dynamics of air resistance (pressure distribution in a cross section in a front-back direction) experienced by the boom according to the comparative example during cruise.

FIG. 5C illustrates an analysis result according to numerical fluid dynamics of air resistance experienced by the boom 18' according to the comparative example during cruise. Here, pressure distribution (total pressure which is a sum of static pressure and dynamic pressure) of the airflow at the cross section in the front-back direction in each of the reference lines AA, A'A', BB, CC, DD, EE, FF shown in FIG. 5A is illustrated. Note that, the white line indicates the flow of the airflow. At the reference line AA, that is, immediately after the rotor position Pa, the airflow does not present a local pressure gradient, and is in a ideal state in which the airflow flows to the back at a nearly constant pressure distribution around the boom 18'.

However, at the reference line A'A', that is, between the rotor positions Pa, Pb, the airflow flows below the boom 18' from left to right (from the outside to the inside) as described above, and then goes around to the right-side plane of the boom 18', thereby generating a low-pressure region, that is, a vortex $e_1$ immediately right to the lower end of the boom 18'. In addition, the airflow flows above the boom 18' from left to right (from the outside to the inside), and then goes around to the right-side plane of the boom 18', thereby generating another low-pressure region, that is, a vortex $e_2$ near the upper right of the boom 18'. These vortexes $e_1$, $e_2$ expand while moving away rightward from the boom 18' as it proceeds to the back, as seen at the reference line BB, that is, immediately after the rotor position Pb.

At the reference line CC, that is, between the rotor positions Pb, Pc, the vortexes $e_1$, $e_2$ further expands, and the airflow flows below the boom 18' from right to left (from the inside to the outside) as described above, and then goes around to the left-side plane of the boom 18', thereby generating another low-pressure region, that is, a vortex $e_3$ immediately left to the lower end of the boom 18'.

At the reference line DD and EE, that is, immediately after the rotor position Pc and between the rotor positions Pc, Pd, the vortexes $e_1$, $e_3$ further expand and move to the left of the boom, and the airflow flows below the boom 18' from right to left (from the inside to the outside) as described above, and then goes around to the left-side plane of the boom 18', thereby generating another low-pressure region, that is, a vortex $e_4$ immediately left to the lower end of the boom 18'. In addition, the airflow flows above the boom 18' from right to left (from the inside to the outside), and then goes around to the left-side plane of the boom 18', thereby generating another low-pressure region, that is, a vortex $e_5$ near the upper left of the boom 18'.

At the reference line FF, that is, immediately after the rotor position Pd, the vortexes $e_1$, $e_3$, $e_4$ further expand and move to the left of the boom, and another vortex $e_6$ is further generated at the lower-left side of the boom 18'.

Generation of the vortexes $e_1$, $e_2$, $e_3$, $e_4$, $e_5$, $e_6$ when the boom 18' receives the airflow from the front suppresses a smooth flow of the airflow, and the air resistance that the boom 18' experiences increases.

Figure 6A:
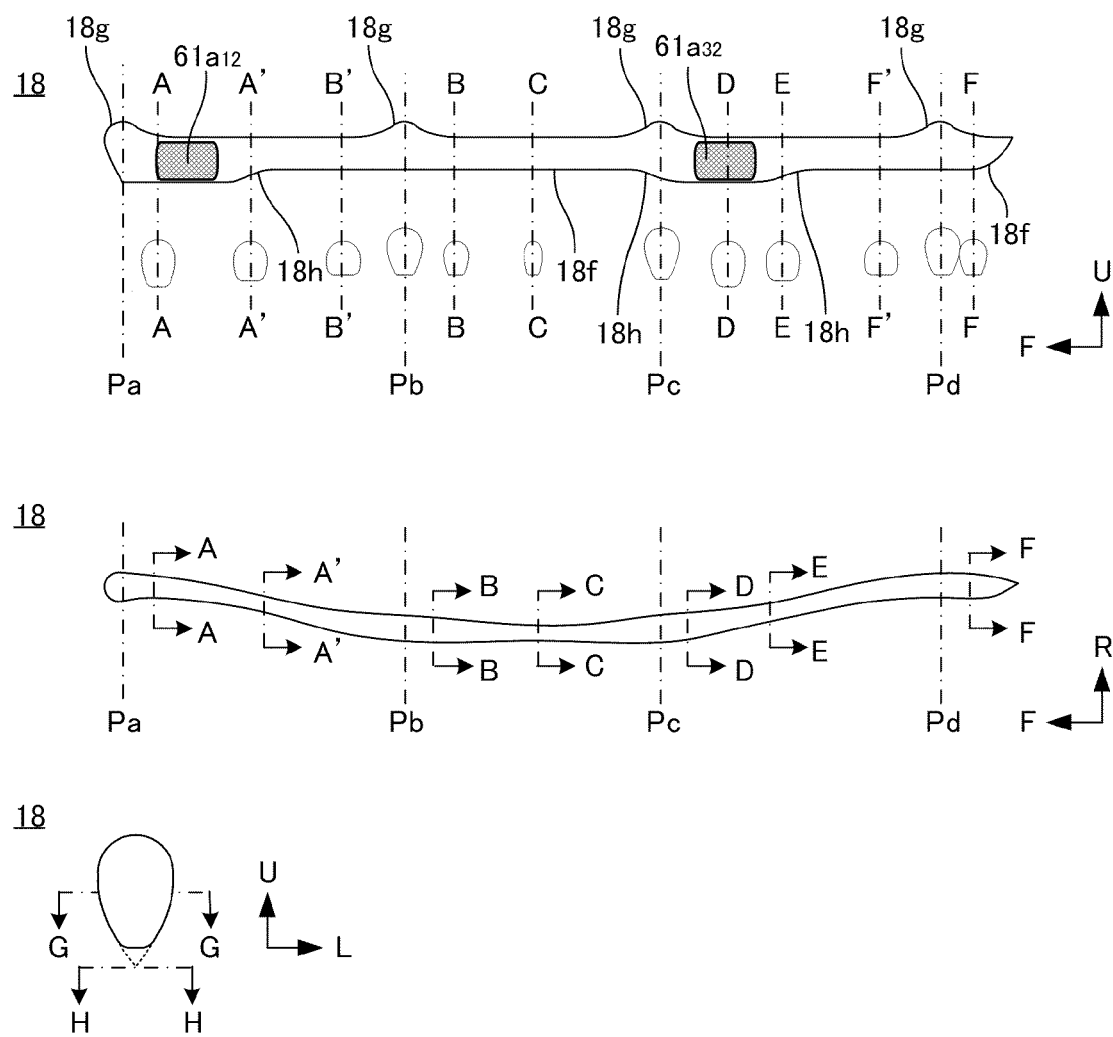
FIG. 6A illustrates a shape of the boom according to the present embodiment.

FIG. 6A illustrates a shape of the boom 18 according to the present embodiment. Note that, the boom 18 is a boom that is arranged on the left-hand side of the fuselage 12, and a boom on the right-hand side is configured to be symmetric therewith. Here, the shape of the boom 18 in the side view and the cross section in the front view on each reference line is shown in the top tier, the shape of the boom 18 in the top view is shown in the middle tier, and the cross section of the boom 18 on reference line AA in the front view is shown in the bottom tier. The positions (rotor positions Pa, Pb, Pc, Pd) at which the VTOL rotors 20a, 20b, 20c, 20d are placed, that is, at which the motors 21 thereof are stored are illustrated by alternate long and short dash lines.

Similarly to the boom 18' according to the comparative example, the boom 18 is molded to extend in the front-back direction while the barrel forms an arc-shaped curvature leftwardly with respect to the front end and the rear end in the top view. However, the boom 18 is molded to have a wing-shaped cross section in which, in the front view at all positions in the front-back direction, the upper side forms a round curvature, the boom 18 being tapered from the upper side toward the lower side, and the lower side being substantially flat (that is, substantially parallel to the front-back and left-right directions). The boom 18 includes storage portions $61a_{12}$, $61a_{32}$, a raised-bottom portion 18f, a tilted portion 18h, and an elevated portion 18g.

The storage portions $61a_{12}$, $61a_{32}$ are rotor portions in which the radiator 61 of the cooling system 60 is stored, and is provided on the boom 18 by the airflow guide structure 70 described above. Also in the storage portions $61a_{12}$, $61a_{32}$, the lower side has a substantially flat wing-shaped cross section, as illustrated in the bottom tier of FIG. 6A or in FIG. 3. The boom 18 according to the present embodiment includes a first storage portion $61a_{12}$ positioned at the rear side of the rotor position Pa and a second storage portion $61a_{32}$ positioned at the rear side of the rotor position Pc. The radiator 61 for cooling the electrical components in each of the VTOL rotors 20a, 20b is stored in the first storage portion $61a_{12}$. Note that, the boom 18 is connected to the front wing 14 between the first storage portion $61a_{12}$ and the rotor position Pb. The radiator 61 for cooling the electrical components in each of the VTOL rotors 20c, 20d is stored in the second storage portion $61a_{32}$. Note that, the boom 18 is connected to the rear wing 16 between the second storage portion $61a_{32}$ and the rotor position Pd.

The raised-bottom portion 18f is a boom portion having a shape in which the lower end (that is, the bottom plane) is positioned on the upper side with respect to the storage portions $61a_{12}$, $61a_{32}$. Here, the raised-bottom portion 18f is positioned at least in the center of the barrel that forms a curvature with respect to the front end and the rear end among the boom 18, that is, between the rotor positions Pb, Pc. In this manner, as shown as (2) in FIG. 5B, the airflow passes outwardly from the inside below the center of curvature of the barrel of the boom 18 during cruise, thereby allowing generation of the vortexes $e_3$, $e_4$, $e_6$ to be avoided. In addition, the raised-bottom portion 18f is positioned on the front side of the barrel that forms a curvature with respect to the front end and the rear end among the boom 18, that is, on the front side of the rotor position Pb. In this manner, as shown as (1) in FIG. 5A, the airflow passes inwardly from the outside below the center of curvature of the barrel of the boom 18 during cruise, thereby allowing generation of the vortex $e_1$ to be avoided.

As such, the boom 18 raises the bottom plane of the boom 18 in at least a part excluding the storage portions $61a_{12}$, $61a_{32}$ to reduce the thickness relative to the up-down direction, which enables the turbulence of airflow such as the vortex that is generated due to an airflow that flows to the left and right below the boom 18 during cruise to be eliminated or suppressed, while also securing a space 18d for storing the radiator 61.

Note that, the raised-bottom portion 18f is further provided at the rear end of the boom 18, that is, on the front side and rear side of the rotor position Pd.

The tilted portion 18h is a boom portion in which the lower end (the bottom plane) is tilted upwardly from each of the storage portions $61a_{12}$, $61a_{32}$ toward the adjacent raised-bottom portion 18f. As such, the boom 18 has a gradual tilt to raise the bottom plane without forming a step portion between the storage portions $61a_{12}$, $61a_{32}$ and the adjacent raised-bottom portion 18f, which enables suppression of turbulence of the airflow that flows below the boom 18.

The elevated portion 18g is a boom portion having a shape in which the upper end is elevated to the upper side with respect to other portions, for example the storage portions $61a_{12}$, $61a_{32}$ at the rotor positions Pa to Pd of the VTOL rotor 20, that is, the positions where the motors 21 thereof are stored. The upper end of the elevated portion 18g is positioned on the upper side with respect to the upper end of the storage portions $61a_{12}$, $61a_{32}$, which allows a space 18d for storing the motor 21, electrical components of other VTOL rotors 20 to be secured without lowering the lower end of the elevated portions 18g.

Further, the end of the boom 18 forms a round curvature in the top view, and is tilted obliquely backward from the upper side toward the lower side in the side view. The rear end of the boom 18 is tapered toward the back in the top view, and is tilted obliquely backward from the lower side to the upper side in the side view. In this manner, the air resistance experienced by the boom 18 during cruise can be further suppressed.

In addition, the boom 18 has a smaller width than the storage portions $61a_{12}$, $61a_{32}$ in which the radiators 61 are stored and the rotor positions Pa to Pd in which the electrical components of the VTOL rotor 20 are stored at the inter-rotor portion in which the storage portions $61a_{12}$, $61a_{32}$ are not included, at the inter-rotor portion between the rotor positions Pb, Pc in the present example, among inter-rotor portions between the rotor positions Pa to Pd. By having a smaller width for the boom portion including less structure, the weight of the boom 18 is reduced.

Figure 6B:
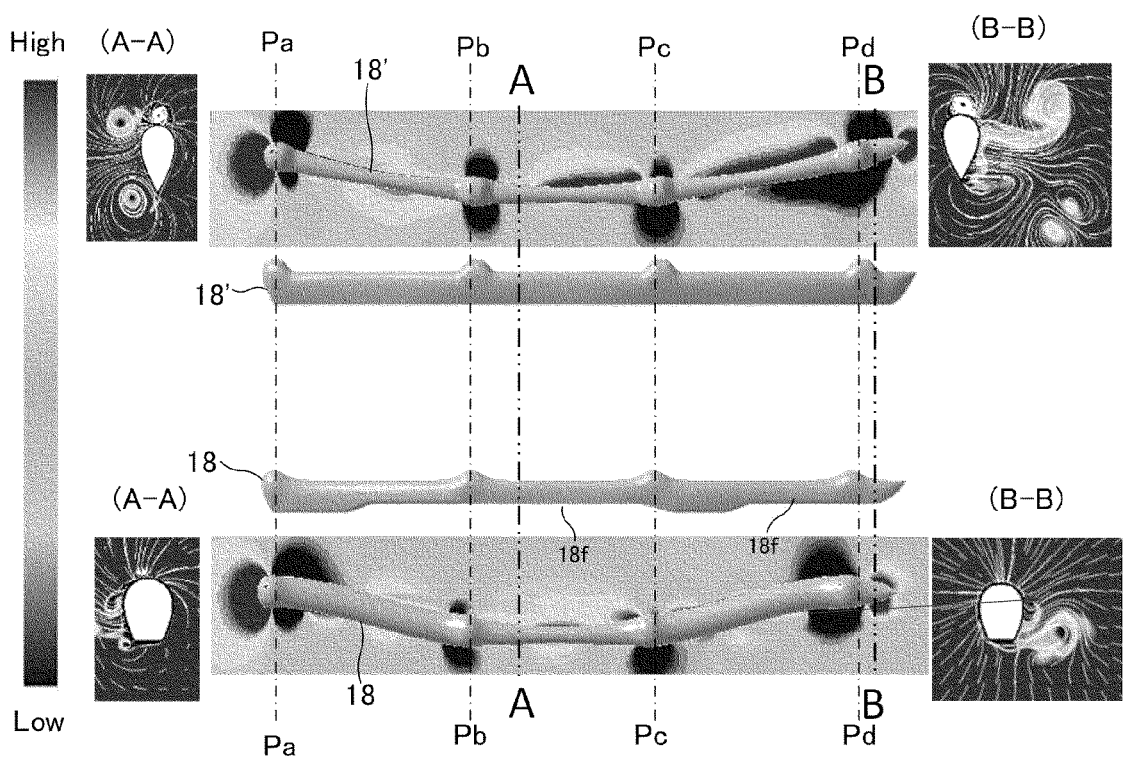
FIG. 6B illustrates an analysis result according to numerical fluid dynamics of air resistance (pressure distribution in a cross section in a front-back direction and a cross section in an up-down direction) experienced by the boom according to the present embodiment and the boom according to the comparative example during cruise.

FIG. 6B illustrates an analysis result according to numerical fluid dynamics of air resistance experienced by the boom 18 according to the present embodiment and the boom 18' according to the comparative example during cruise. Here, for the boom 18 and the boom 18' respectively in the upper tier and the lower tier, the pressure distribution (static pressure) of the airflow at the cross section in the up-down direction is shown in the center, the pressure distribution (total pressure) at the cross section in the front-back direction at reference line AA in the center figure is shown on the left, and the pressure distribution (total pressure) at the cross section in the front-back direction at reference line BB in the center figure is shown on the right. Note that, the white line indicates the flow of the airflow.

As previously described using FIG. 5B and FIG. 5C, the analysis result for the boom 18' is that due to the pressure difference that is generated on the left and right (that is, the outside and inside) slightly on the front side between the rotor positions Pa, Pb, the airflow flows from left to right (from the outside to the inside) respectively below and above the front side of the boom 18' and then goes around to the right-side plane. In this manner, at the reference line AA, that is, on the rear side of the rotor position Pb, a low-pressure region, that is, a vortex is generated each near the lower end of the boom 18' and near the upper end. In addition, due to the pressure difference that is generated on the left and right (the outside and the inside) slightly on the rear side between the rotor positions Pb, Pc and between the rotor positions Pc, Pd, the airflow flows from right to left (from the inside to the outside) respectively below and above the rear side from the center of the boom 18' and then goes around to the left-side plane. In this manner, at the reference line BB, that is, the rotor position Pd, a large low-pressure region, that is, a vortex is generated in a region expanding from near the left-side plane of the boom 18' to the upper-left direction.

In contrast, according to the analysis result for the boom 18, by providing the raised-bottom portion 18f on the front side of the rotor position Pb, the pressure difference between left and right (that is, the outside and the inside) between the rotor positions Pa, Pb is reduced, and the airflow that flows from left to right (from the outside to the inside) each below and above the front side of the boom 18 and then goes around to the right-side plane is weakened. In this manner, at the reference line AA, that is, on the rear side of the rotor position Pb, a low-pressure region is generated in a narrow range each near the lower end of the boom 18 and near the upper end, that is, only a small vortex is generated. In addition, by providing a raised-bottom portion 18f at the center of the barrel of the boom 18, that is, between the rotor positions Pb, Pc, the pressure difference on the left and right (the outside and the inside) between the rotor positions Pc, Pd is reduced, and the airflow that flows from right to left (from the inside to the outside) each below and above from the center to the rear side of the boom 18, and then goes around to the right-side plane is weakened. In this manner, at the reference line BB, that is, the rotor position Pd, although a low-pressure region is generated to the left of the lower end of the boom 18, generation of a large low-pressure region that spans from near the left-side plane to the upper left direction generated with respect to the boom 18'. Accordingly, it is understood that the air resistance experienced during cruise is suppressed for the boom 18.

Note that, since the boom 18' has a wing-shaped cross section with the upper side forming a round curvature, and being tapered from the upper side toward the lower side, the airflow is divided to the left and right from the upper end of the boom 18', flows downwardly along the curved upper plane, and flows downwardly while diverting from the side planes of the boom 18' where it starts to taper and spreading to the left and right. In contrast, since the boom 18 has a wing-shaped cross section in which the upper side forms a round curvature, the boom 18 being tapered from the upper side toward the lower side, and the lower side is molded to be substantially flat (that is, substantially parallel to the front and back and the left-right direction), similarly to the case of the boom 18', the airflow is divided to the left and right from the upper end of the boom 18, flows downwardly along the curved upper plane, and flows downwardly while being diverted from the side planes of the boom 18 where it starts to taper and spreading to the left and right, and the airflow further goes around below the flat plane to cause turbulence. In this manner, the air resistance experienced by the boom 18 during vertical take-off and landing may become larger.

Figure 6C:
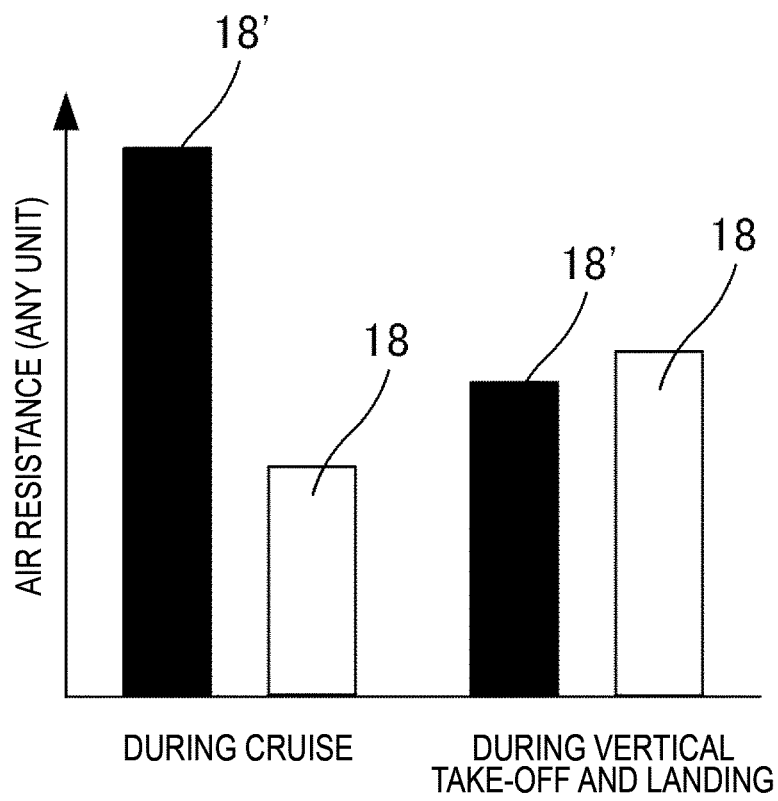
FIG. 6C illustrates an analysis result according to numerical fluid dynamics of air resistance experienced by the boom according to the present embodiment and the boom according to the comparative example during cruise and during vertical take-off and landing.

FIG. 6C illustrates an analysis result according to numerical fluid dynamics of air resistance experienced by the boom 18 according to the present embodiment and the boom 18' according to the comparative example during cruise and during vertical take-off and landing. The air resistance during vertical take-off and landing of the boom 18 is larger by about 10% relative to the boom 18', the air resistance of the boom 18 during cruise is reduced by about 60%. Accordingly, by employing the shape of the boom 18 according to the present embodiment, the air resistance during cruise can be reduced with little increase in the air resistance during vertical take-off and landing.

Figure 7A:
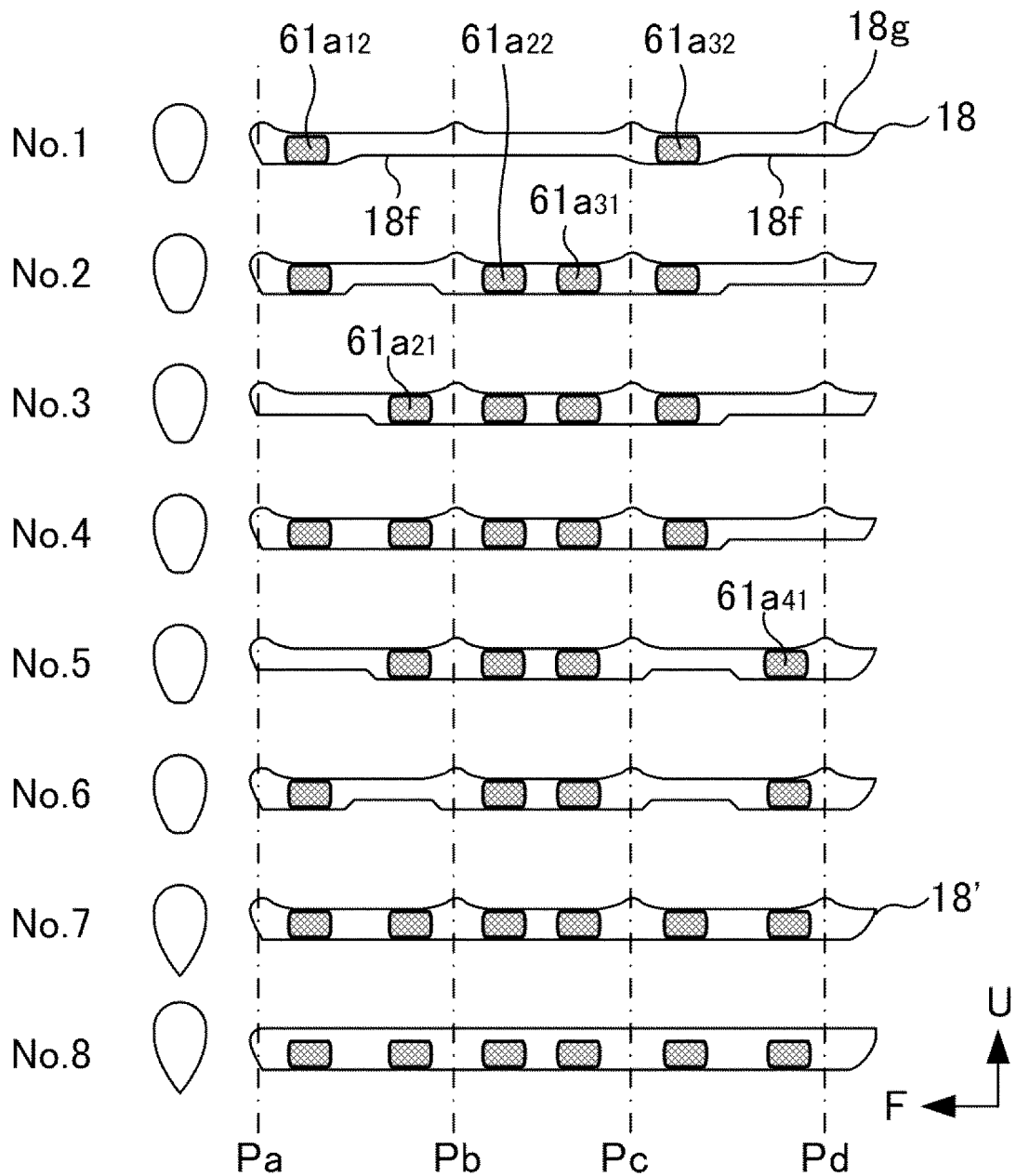
FIG. 7A illustrates an example of a shape of the boom and an arrangement of a cooling apparatus.

FIG. 7A illustrates an example of a shape of the boom and an arrangement of the storage portion of the radiator 61. The boom in example 1 (No. 1) is the boom 18 according to the present embodiment, which includes the storage portions $61a_{12}$, $61a_{32}$ respectively at the rear side of the rotor positions Pa, Pc, a raised-bottom portion 18f on the front side of the rotor position Pb, between the rotor positions Pb, Pc, and at the front and back of the rotor position Pd, and an elevated portion 18g at each of the rotor positions Pa to Pd. The boom in example 2 (No. 2) includes the storage portions $61a_{12}$, $61a_{22}$, $61a_{31}$, $61a_{32}$ respectively on the rear side of the rotor positions Pa, Pb and at the front and back of the rotor position Pc, raised-bottom portions 18f on the front side of the rotor position Pb and at the front and back of the rotor position Pd, and an elevated portion 18g at each of the rotor positions Pa to Pd. The boom in example 3 (No. 3) includes the storage portions $61a_{21}$, $61a_{22}$, $61a_{31}$, $61a_{32}$ respectively at the front and back of the rotor position Pb and at the front and back of the rotor position Pc, raised-bottom portions 18f on the rear side of the rotor position Pa and at the front and back of the rotor position Pd, and an elevated portion 18g at each of the rotor positions Pa to Pd. The boom in example 4 (No. 4) includes the storage portions $61a_{12}$, $61a_{21}$, $61a_{22}$, $61a_{31}$, $61a_{32}$ respectively on the rear side of the rotor position Pa, at the front and back of the rotor position Pb and at the front and back of the rotor position Pc, raised-bottom portions 18f at the front and back of the rotor position Pd, and an elevated portion 18g at each of the rotor positions Pa to Pd. The boom in example 5 (No. 5) includes the storage portions $61a_{21}$, $61a_{22}$, $61a_{31}$, $61a_{41}$ respectively at the front and back of the rotor position Pb, on the front side of the rotor position Pc, and on the front side of the rotor position Pd, raised-bottom portions 18f on the rear side of the rotor position Pa and the rear side of the rotor position Pc, and an elevated portion 18g at each of the rotor positions Pa to Pd. The boom in example 6 (No. 6) includes the storage portions $61a_{12}$, $61a_{22}$, $61a_{31}$, $61a_{41}$ respectively on the rear side of the rotor position Pa, on the rear side of the rotor position Pb, on the front side of the rotor position Pc, and on the front side of the rotor position Pd, raised-bottom portions 18f on the front side of the rotor position Pb and the rear side of the rotor position Pc, and an elevated portion 18g at each of the rotor positions Pa to Pd. The boom in example 7 (No. 7) is the boom 18' according to the comparative example described above, and includes the storage portions $61a_{12}$, $61a_{21}$, $61a_{22}$, $61a_{31}$, $61a_{32}$, $61a_{41}$ respectively on the rear side of the rotor position Pa, at the front and back of the rotor position Pb, at the front and back of the rotor position Pc, and on the front side of the rotor position Pd, and an elevated portion 18g at each of the rotor positions Pa to Pd, and does not include a raised-bottom portion 18f. The boom in example 8 (No. 8) includes the storage portions $61a_{12}$, $61a_{21}$, $61a_{22}$, $61a_{31}$, $61a_{32}$, $61a_{41}$ respectively on the rear side of the rotor position Pa, at the front and back of the rotor position Pb, at the front and back of the rotor position Pc, and on the front side of the rotor position Pd, and does not include the raised-bottom portion 18f and the elevated portion 18g. Note that, these booms have it in common that they are molded to extend in the front-back direction with the barrel forming an laterally arc-shaped curvature with respect to the front end and the rear end.

Figure 7B:
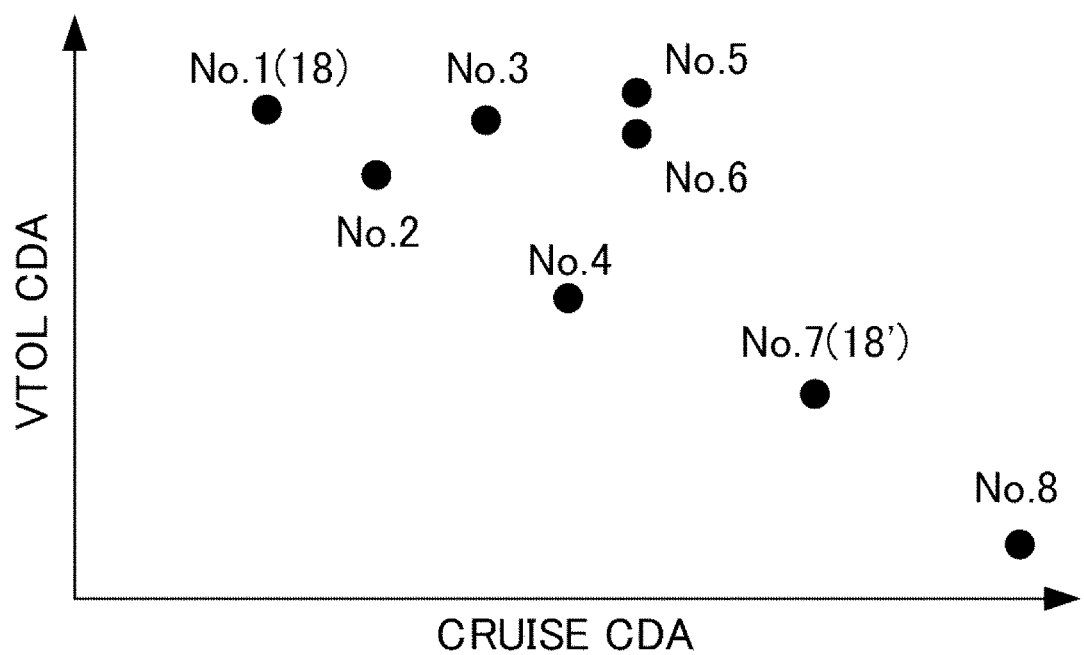
FIG. 7B illustrates an analysis result according to numerical fluid dynamics of air resistance experienced by each of the plurality of booms shown in FIG. 7A during cruise and during VTOL.

FIG. 7B illustrates an analysis result according to numerical fluid dynamics of air resistance experienced by each of the boom for each of the booms in example 1 to example 8 during cruise and during vertical take-off and landing. The horizontal axis indicates the air resistance experienced during cruise, and the vertical axis indicates the air resistance experienced during vertical take-off and landing. For the boom in example 7 (the boom 18' according to a modification example), the air resistance during vertical take-off and landing is small, as described above, but the air resistance during cruise is large. For the boom in example 8, since it does not include the elevated portion 18g, the air resistance during vertical take-off and landing is smaller than that of the boom in example 7, but the air resistance during cruise is large. In contrast, for the booms in example 1 to example 6, since they include the raised-bottom portion 18f, the air resistance during vertical take-off and landing is larger to some extent than that of the boom in example 7, but the air resistance during cruise is reduced. Here, the resistance during cruise is reduced for the booms in example 1 to example 3, which include the raised-bottom portions 18f on the front side of the rotor position Pb (or the rear side of the rotor position Pa) and at the front and back of the rotor position Pd. Among those, the resistance during cruise is further reduced for the boom in example 1 which further includes the raised-bottom portion 18f between the rotor positions Pb, Pc. For these results, it is understood that, as in the boom 18 according to the present embodiment, it is effective to raise the lower end of the boom between the rotor positions Pb, Pc and on the front side of the rotor position Pb to reduce the resistance during cruise.

The aircraft 100 according to the present embodiment includes a fuselage 12, a front wing 14 and a rear wing 16 that are provided to extend laterally from the fuselage 12 and configured to generate lift during cruise, a boom 18 that is supported by the front wing 14 and the rear wing 16 to be spaced apart from the fuselage 12, and at least one VTOL rotor 20 that is supported on the boom 18, the at least one VTOL rotor 20 having one or more blades 23 configured to generate thrust in a vertical direction during take-off and landing, wherein the boom 18 has a shape in a top view in which a barrel forms a curvature in a direction away from the fuselage 12 with respect to a front end and a rear end while extending in a front-back direction, and has a cross section in a front view in which an upper side forms a round curvature, the boom being tapered from an upper side from a lower side, and the lower side is substantially flat. Since the boom 18 has a shape in the top view in which the barrel extends in the front-back direction while forming a curvature in the direction away from the fuselage 12 with respect to the front end and the rear end, the airflow passes below the boom 18 during cruise, which causes a turbulence (in particular, a vortex) to occur. However, since the boom 18 has a cross section in the front view in which the upper end forms a round curvature, being tapered from the upper side toward the lower side, and in which the lower side is substantially flat, the turbulence in the airflow can be eliminated or suppressed, which reduces the air resistance experienced by the boom during cruise, thereby enabling cruise with little resistance.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An aircraft comprising:
a fuselage;
a wing body that is provided to extend laterally from the fuselage and configured to generate lift during cruise;
a boom that is supported by the wing body to be spaced apart from the fuselage; and
at least one rotor supported on the boom, the at least one rotor having one or more blades configured to generate thrust in a vertical direction during take-off and landing, wherein
the boom has a shape in a top view in which a barrel forms a curvature in a direction away from the fuselage with respect to a front end and a rear end while extending in a front-back direction, and has a cross section in a front view in which an upper side forms a round curvature, the boom being tapered from the upper side from a lower side, and the lower side is substantially flat.

2. The aircraft according to claim 1, wherein the boom is configured to store a rotational apparatus for rotating the one or more blades of the at least one rotor and a radiator for cooling the rotational apparatus, and includes a raised-bottom portion having a lower end thereof positioned on an upper side with respect to an storage portion for storing the radiator.

3. The aircraft according to claim 2, wherein the raised-bottom portion is positioned at least at a center of the barrel forming a curvature with respect to the front end and the rear end of the boom.

4. The aircraft according to claim 2, wherein the raised-bottom portion is positioned at least at a front side of the barrel forming a curvature with respect to the front end and the rear end of the boom.

5. The aircraft according to claim 2 or 3, wherein the raised-bottom portion is positioned at least at a front side of the barrel forming a curvature with respect to the front end and the rear end of the boom.

6. The aircraft according to claim 2, wherein the boom has a shape in which an upper end of a rotor position for storing the rotational apparatus is positioned on an upper side with respect to the storage portion.

7. The aircraft according to claim 3, wherein the boom has a shape in which an upper end of a rotor position for storing the rotational apparatus is positioned on an upper side with respect to the storage portion.

8. The aircraft according to claim 2, wherein
the boom is configured to store four rotational apparatuses for rotors at a first rotor position, a second rotor position, a third rotor position, and a fourth rotor position arranged from front to back, respectively, and
the storage portion includes a first storage portion positioned at a rear side of the first rotor position and a second storage portion positioned at a rear side of the third rotor position.

9. The aircraft according to claim 3, wherein
the boom is configured to store four rotational apparatuses for rotors at a first rotor position, a second rotor position, a third rotor position, and a fourth rotor position arranged from front to back, respectively, and
the storage portion includes a first storage portion positioned at a rear side of the first rotor position and a second storage portion positioned at a rear side of the third rotor position.

10. The aircraft according to claim 8, wherein the raised-bottom portion is positioned between the second rotor position and the third rotor position.

11. The aircraft according to claim 8, wherein the raised-bottom portion is positioned at a front side of the second rotor position.

12. The aircraft according to claim 10, wherein the raised-bottom portion is positioned at a front side of the second rotor position.

13. The aircraft according to claim 8, wherein the boom has a smaller width than the storage portion at an inter-rotor portion that does not include the storage portion among inter-rotor portions between the first rotor position through the fourth rotor position.

14. The aircraft according to claim 10, wherein the boom has a smaller width than the storage portion at an inter-rotor portion that does not include the storage portion among inter-rotor portions between the first rotor position through the fourth rotor position.

15. The aircraft according to claim 2, wherein a lower end of the boom is tilted from the storage portion to the raised-bottom portion.

16. The aircraft according to claim 3, wherein a lower end of the boom is tilted from the storage portion to the raised-bottom portion.

17. The aircraft according to claim 1, wherein the boom has a shape in which the front end forms a round curvature and the rear end is tapered.

18. The aircraft according to claim 2, wherein the boom has a shape in which the front end forms a round curvature and the rear end is tapered.

19. The aircraft according to claim 1, further comprising a cruising rotor that is provided at a rear end of the fuselage, the cruising rotor having one or more blades for generating thrust during cruise.

20. The aircraft according to claim 2, further comprising a cruising rotor that is provided at a rear end of the fuselage, the cruising rotor having one or more blades for generating thrust during cruise.

* * * * *